Dec. 14, 1937.   L. H. MORIN ET AL   2,102,328
METHOD OF MAKING THERMOPLASTIC FASTENERS
Filed Oct. 4, 1934
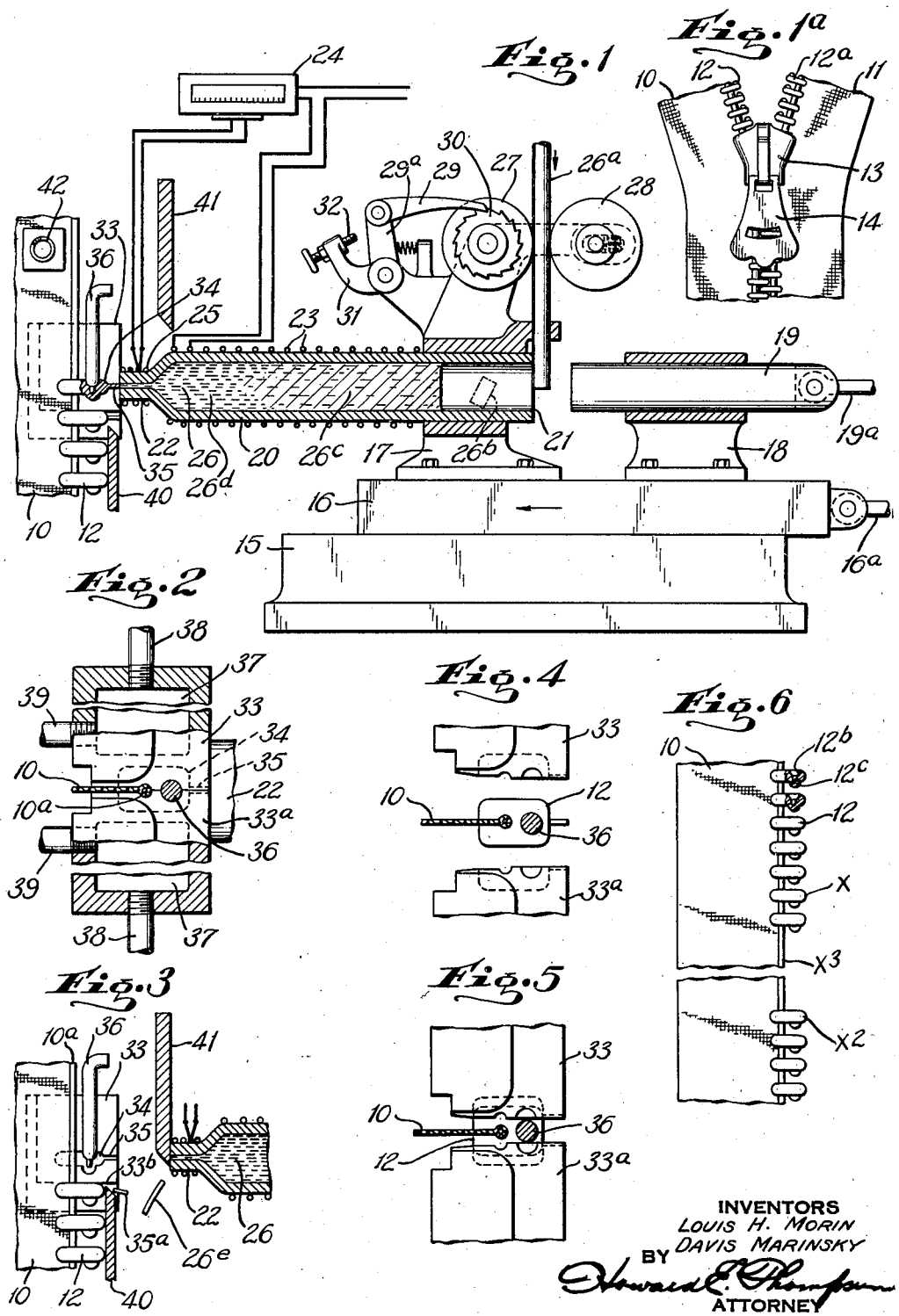
INVENTORS
LOUIS H. MORIN
DAVIS MARINSKY
BY
*Howard E. Thompson*
ATTORNEY Patented Dec. 14, 1937

2,102,328

UNITED STATES PATENT OFFICE 2,102,328

METHOD OF MAKING THERMOPLASTIC FASTENERS

Louis H. Morin and Davis Marinsky, Bronx, N. Y., assignors to Whitehall Patents Corporation, New York, N. Y., a corporation of New York Application October 4, 1934, Serial No. 746,771

10 Claims. (Cl. 18—59)

This invention relates to separable slide fasteners employing stringers having coupling elements or links thereon adapted to be coupled and uncoupled in closing and opening the fastener; and the object of the invention is to provide a fastener of the class described wherein the separate links or coupling elements are formed from thermoplastic material die cast directly upon the mounting tape of the stringer; a further object being to provide a method of forming stringers of the class described which consists in applying a series of links to a tape forming a stringer length by a successive series of individual castings; a further object being to provide means for injecting a suitable thermoplastic material into the impression of the dies under pressure in forming the castings, and further to the provision of means for replenishing the supply of thermoplastic material to compensate for the material used in forming each casting to maintain a constant supply during the cycle of operation of the machine; a further object being to provide means for heating the storage cylinder for the thermoplastic material to reduce the solidified material supplied thereto to a substantially fluid or plastic state, and further to the provision of means for heating the discharge nozzle to prevent clogging or congestion of the material therein; a further object being to provide means for controlling and regulating the feed or supply of solidified thermoplastic material to the supply cylinder to maintain a supply of material consistent with and to suit the production demands of the castings formed in the operation of the machine; and with these and other objects in view, the invention consists in a device of the class and for the purpose specified which is constructed in accordance with the method more fully hereinafter described and claimed.

The invention is fully disclosed in the following specification, of which the accompanying drawing forms a part, in which the separate parts of the improvement are designated by suitable reference characters in each of the views, and in which:

Fig. 1 is a diagrammatic, sectional view illustrating the method of forming castings in accordance with the invention.

Fig. 1a is a detail view of a part of a separable fastener indicating stringers formed according to our invention.

Fig. 2 is a plan and sectional view of the dies shown in Fig. 1.

Fig. 3 is a view similar to Fig. 2 showing only a part of the construction and with parts in different positions.

Fig. 4 is a view similar to Fig. 2 showing only a part of the construction and with parts in a different position.

Fig. 5 is a view similar to Fig. 4 showing the dies partially closed; and,

Fig. 6 is a detail view of a part of a complete stringer made according to our invention.

Our invention relates to the manufacture of separable slide fasteners, part of one of which is indicated in Fig. 1a of the drawing which consists of stringers 10 and 11 upon which are disposed links or coupling elements 12, 12a which are coupled and uncoupled by a slide member 13 movable along the stringers, the slide including a finger piece 14, by means of which the same is operated.

For the purpose of illustration, we have indicated diagrammatically in Figs. 1 to 5 of the drawing, a method of carrying the invention into effect, and in Fig. 1, 15 represents a table or other support of a suitable casting machine; 16 a slide plate movable longitudinally of the table by means of a link 16a connected with a suitable source of drive. Secured to the slide 16 are brackets 17 and 18, the latter forming a bearing or guide for a piston or plunger 19 operated through a link or rod 19a coupled with a suitable operating means of the machine.

Supported in the bracket 17 is a cylinder 20 open at one end as indicated at 21, and the other end of which terminates in a reduced discharge nozzle 22. The cylinder 20 is heated preferably by electric coils indicated at 23, the source of supply passing through a pyrometer 24, by means of which the temperature may be controlled, whereas another heating coil 25 formed preferably from pyod wire is disposed around the nozzle 22 and controls the temperature of the cylinder and especially the nozzle thereof to maintain the plastic material 26 in the desired state of fluidity to facilitate the casting operation contemplated.

In practice, the casting material employed in the form of a substantially solidified wire, ribbon or strip-like body 26a is fed into position at the open end 21 of the cylinder and is cut off by the plunger 19 and forced into the cylinder as is indicated at 26b in dotted lines in Fig. 1. As the material advances in the cylinder, it is partially melted as is indicated at 26c until it becomes completely melted and of a substantially fluid state as is indicated at 26d. The so-termed fluid state is in the form of a syrup or plastic mass suitable for transmission from the nozzle 22 into the dies employed under sufficient pressure. Here it is to be understood that by virtue of using a relatively small cylinder as well as a relatively small amount of the casting material, the pressure required for performing the desired operation may be materially reduced.

The feeding means of the casting material 26a consists of a driven roller 27 cooperating with a spring pressed roller 28 both supported in connection with the bracket 17, the roller 27 being operated by a pawl 29 engaging a ratchet 30 on said roller, the pawl being operated by a feed arm 31 having an adjustable pin 32 which strikes the pawl or the part 29a thereof in the operation of rotating the feed roller 27. By adjusting the screw 32, the amount of feed of the material 26a may be controlled and regulated to maintain the desired supply of plastic material to the cylinder 20.

At 33, 33a, we have shown the dies employed for forming the cast links 12, 12a, each die part having on adjacent surfaces, recesses defining the contour of the links to be formed in what is commonly termed the impression 34 of the die having a passage or gate 35 on the parting line of the dies with which the discharge of the nozzle 22 registers as is indicated in Fig. 1 of the drawing in the operation of discharging the material 26 into the impression 35.

We also dispose between the adjacent surfaces of the dies 33, 33a a core pin 36, the end of which extends into the impression 34 so that the cast link will be formed on the core, and said core will form the recess 12b on one side face thereof to receive the projecting knob or bead 12c on the link of a companion stringer when said stringers are coupled together.

The adjacent surfaces of the dies are also recessed to receive the mounting strip or tape upon which the links are cast, the tape 10, for illustration, being shown in Figs. 2 to 5 inclusive. Both tapes 10 and 11 have beaded edges upon which the links are cast, the bead on the strip 10 being indicated at 10a in said figures. The dies 33 and 33a are provided with water circulating passages 37 which extend to a point adjacent the impression 34, and at 38, we have shown inlet pipes and at 39 outlet pipes completing the circulation of water through said dies. This construction will provide a quick chilling of the plastic material within the impressions to produce substantially perfect castings.

We have also diagrammatically indicated two trimming knives or tools 40 and 41, the tool 40 being used to trim off the gate 35a from each cast link, as is indicated in Fig. 3 of the drawing, whereas the tool 41 is adapted to trim off a surplus of the plastic material which may ooze out from the nozzle during the operation of retracting the piston 19 and in moving the nozzle 22 away from the dies 33 and 33a as is indicated at 26e in Fig. 3 of the drawing. At the same time, the tool 41 remains over the discharge end of the nozzle to act as a cover or closure prior to again moving the nozzle into engagement with the dies, as will be apparent.

It will also be understood that the beaded edge of the tape extends into the impression 34 of the dies and that the plastic material is cast around that portion of the strip disposed within the impression and when the strip 10 is composed of a woven or braided fabric, it will be apparent that the casting material will extend into and penetrate through the interstices of the braid to securely retain the castings thereon. However, in casting upon relatively smooth fabrics or other mounting members, the surface contact together with the beading or other shaping of the mounting member will serve as anchoring means, it being understood in this connection that the mounting member may be perforated where the castings are formed thereon to provide anchor portions.

The several steps in the method of forming fasteners of the class under consideration in accordance with our present invention will be understood from the foregoing description when taken in connection with the accompanying drawing and the following statement. The dies 33, 33a are first moved into closed position into firm engagement with each other and with the tape 10 supported in the path of movement of the dies. The tape is temporarily held, when the dies are separated, by a means indicated at 42 in Fig. 1 of the drawing. The dies are also held in engagement with the core 36 which is supported in position as represented in Fig. 3 of the drawing. The plate 16 now moves forwardly in the direction of the dies to bring the nozzle 22 of the cylinder from the position shown in Fig. 3 to the position shown in Fig. 1, the tool 41 having been moved out of the path of movement of the cylinder 20. The piston or plunger 14 now moves forwardly to cut off a previously advanced portion of the strip 26a to discharge it into the cylinder in the manner indicated at 26b, the piston advancing further into the cylinder to engage the plastic material therein and to apply sufficient pressure thereon to force the material from the nozzle 22 into the impression 34 through the gate or passage 35. The piston 19 and cylinder 20 are now moved away from the dies, and the tool 41 operated to discharge any surplus of casting material that may extend beyond the surface of the nozzle as is indicated at 26e in Fig. 3 of the drawing.

At the same time or during the above operation of the piston and cylinder, the dies 33, 33a are separated as indicated in Fig. 4 of the drawing, leaving the casting supported on the core 36, which acts as an ejector means. This core is now operated by suitable means to feed the formed casting together with the tape downwardly to position the cast link adjacent the lower surface 33b of the dies as is indicated in Fig. 3 of the drawing, at which time, the dies 33 and 33a are again moved toward each other into a partially closed position as is indicated in Fig. 5 of the drawing so that the surface 33b thereof will rest upon the upper surface of the cast link. The core 36 is now moved upwardly out of engagement with the cast link and again returned into the position shown in Fig. 3. This operation of feeding and removing the core serves to accurately space the successive links on the tape, which is clearly shown upon a consideration of Fig. 3 of the drawing. After casting a successive series of links on the tape to produce a definite or predetermined stringer length, the mounting tape may be independently fed to form a wide spacing to divide the stringer lengths into groups such as indicated at $x$, $x2$ in Fig. 6 of the drawing, the spacing of the tape being indicated at $x3$.

Our improved method may be utilized in die casting the several elements or links of a complete slide fastener, and it is not essential that the castings be formed directly upon a supporting body nor that they be of the specific contour or size herein indicated. We may use thermoplastic materials which will be suitable for producing fastener devices of the kind under consideration, and such materials as cellulose acetate are preferably used, it being further apparent that these materials may be of any desired colors or combinations of colors to produce in the finished products any desired color effects to be consistent with or in harmony with the articles of merchandise or apparel in connection with which the separate fasteners are to be employed. By using casting materials of the kind under consideration, the production of color effects is substantially unlimited. The accompanying drawing is only a diagrammatic illustration of means for carrying the method into effect and also the relative sizes of the parts shown are purely diagrammatic for the purpose of clearly illustrating the invention.

Having fully described our invention, what we claim as new and desire to secure by Letters Patent, is:

1. The herein described method of manufacturing stringers of separable fasteners, which consists in arranging the mounting strip of the stringer between casting dies movable toward and from each other, the dies having an impression around a portion of the strip disposed therebetween, providing a cylinder containing thermoplastic material with a nozzle at one end of the cylinder, heating the cylinder, maintaining the thermoplastic material soft and moldable at the nozzle end of the cylinder and at different degrees of softness in a direction away from said nozzle and substantially hard at the outer feed end of the cylinder, moving the nozzle toward and from the dies, and applying pressure to the thermoplastic material in the cylinder to discharge said material from the nozzle thereof into the impression of said dies along the parting line thereof to form a thermoplastic link cast directly upon that portion of the strip disposed within the impression of said dies.

2. The herein described method of die casting thermoplastic bodies of a separable slide fastener which consists in providing relatively movable dies with an impression defining the contour of the member to be cast upon adjacent surfaces of the dies, providing a container for thermoplastic material having a discharge nozzle at one end thereof movable toward and from the parting line of the dies, heating the container longitudinally thereof to render the thermoplastic material soft and moldable at the nozzle end of the container while maintaining such material relatively hard at the other end of said container, providing a plunger movable longitudinally in the last named end portion of said container to apply pressure to heated thermoplastic material arranged therein to discharge the same through said nozzle and into the impression of the dies along the parting line thereof to form said cast thermoplastic body.

3. The herein described method of die casting thermoplastic bodies of a separable slide fastener which consists in providing relatively movable dies with an impression defining the contour of the member to be cast upon adjacent surfaces of the dies, providing a heated container for thermoplastic material having a discharge nozzle at one end thereof movable toward and from the dies, providing a plunger movable longitudinally in said container to apply pressure to heated thermoplastic material arranged therein to discharge the same through said nozzle and into the impression of the dies along the parting line thereof to form said cast thermoplastic body, and feeding thermoplastic material into the container forwardly of said plunger in each stroke thereof to maintain a constant supply of thermoplastic material in the container consistent with the castings produced in each operation of the plunger.

4. The herein described method of die casting thermoplastic bodies of a separable slide fastener which consists in providing relatively movable dies with an impression defining the contour of the member to be cast upon adjacent surfaces of the dies, providing a heated container for thermoplastic material having a discharge nozzle at one end thereof movable toward and from the dies, providing a plunger movable longitudinally in said container to apply pressure to heated thermoplastic material arranged therein to discharge the same through said nozzle and into the impression of the dies along the parting line thereof to form said cast thermoplastic body, feeding thermoplastic material into the container forwardly of said plunger in each stroke thereof to maintain a constant supply of thermoplastic material in the container consistent with the castings produced in each operation of the plunger, arranging the thermoplastic material supplied to the container in the form of a strip, and utilizing the plunger as a means for severing a portion of the material from said strip and feeding the same into said container.

5. The herein described method of die casting thermoplastic bodies of a separable slide fastener which consists in providing relatively movable dies with an impression defining the contour of the member to be cast upon adjacent surfaces of the dies, providing a heated container for thermoplastic material having a discharge nozzle at one end thereof movable toward and from the dies, providing a plunger movable longitudinally in said container to apply pressure to heated thermoplastic material arranged therein to discharge the same through said nozzle and into the impression of the dies along the parting line thereof to form said cast thermoplastic body, feeding thermoplastic material into the container forwardly of said plunger in each stroke thereof to maintain a constant supply of thermoplastic material in the container consistent with the castings produced in each operation of the plunger, arranging the thermoplastic material supplied to the container in the form of a strip, utilizing the plunger as a means for severing a portion of the material from said strip and feeding the same into said container, and providing adjustable means for regulating the amount of material supplied to said container.

6. The herein described method of forming cellulose acetate die cast members of separable fasteners which consists in providing relatively movable dies with a core disposed between adjacent surfaces and on the parting line thereof, providing a container with a nozzle at one end for engagement with the dies at their parting line, heating the container and cellulose acetate arranged therein, maintaining the cellulose acetate at a hard consistency at one end of the container and at a semi-fluid consistency at the nozzle end portion of the container, applying pressure to the heated cellulose acetate in said container to introduce the same into said dies along the parting line thereof while maintaining the dies in firm engagement with each other to form, in the impression of the dies, a cast cellulose acetate body formed upon said core, separating said dies and utilizing the core as a means for ejecting the casting from the dies and further as a means to feed the casting out of alinement with the impression of said dies.

7. The herein described method of forming cellulose acetate die cast members of separable fasteners which consists in providing relatively movable dies with a core disposed between adjacent surfaces and on the parting line thereof, providing a container with a nozzle at one end for engagement with the dies at their parting line, heating the container and cellulose acetate arranged therein, maintaining the cellulose acetate at a hard consistency at one end of the container and at a semi-fluid consistency at the first named end portion of the container, applying pressure to the heated cellulose acetate in said container to introduce the same into said dies along the parting line thereof while maintaining the dies in firm engagement with each other to form, in the impression of the dies, a cast cellulose acetate body formed upon said core, separating said dies and utilizing the core as a means for ejecting the casting from the dies and further as a means to feed the casting out of alinement with the impression of said dies, and intermittently feeding cellulose acetate into the container to maintain a supply therein dependent on the production of each casting.

8. The herein described method of forming thermoplastic die cast members of the class described which comprises intermittently feeding thermoplastic material in solid hard form into the feed end portion of an elongated cylinder, heating the other or discharge end portion of the cylinder to transform the thermoplastic material from a hard consistency at the feed end portion thereof to a semi-fluid consistency at the nozzle end of the cylinder, applying pressure intermittently and simultaneously with said intermittent feeding to the thermoplastic material at the feed end portion of said cylinder to discharge the semi-fluid material through the nozzle end of the cylinder into the mold cavity of relatively movable dies to form in said cavity the die cast thermoplastic member.

9. The herein described method of forming thermoplastic die cast members of the class described which comprises intermittently feeding thermoplastic material in solid hard form into the feed end portion of an elongated cylinder, heating the other or discharge end portion of the cylinder to transform the thermoplastic material from a hard consistency at the feed end portion thereof to a semi-fluid consistency at the nozzle end of the cylinder, applying pressure intermittently and simultaneously with said intermittent feeding to the thermoplastic material at the feed end portion of said cylinder to discharge the semi-fluid material through the nozzle end of the cylinder into the mold cavity of relatively movable dies to form in said cavity the die cast thermoplastic member, and utilizing the pressure medium employed for discharging the material from said cylinder as a means for delivery of the hard thermoplastic material to the feed end portion of the cylinder.

10. The herein described method of forming thermoplastic die cast members of the class described, which consists in providing relatively movable dies having a mold cavity between adjacent surfaces thereof and an admission passage opening into said cavity on the parting line of the dies, providing an elongated cylinder, the nozzle end of which is movable into and out of engagement with the admission passage of said dies, intermittently feeding thermoplastic material in solid hard form into the feed end portion of the cylinder, heating the other or discharge end portion of the cylinder to transform the thermoplastic material from a hard consistency at the feed end portion thereof to a semi-fluid consistency at the nozzle end of the cylinder, moving the cylinder into registering position with said passage then applying pressure to the thermoplastic material at the feed end portion of the cylinder to discharge the thermoplastic material through the nozzle end of the cylinder into the mold cavity of the dies through said passage, then moving the cylinder out of registering alinement with the passage, then trimming the thermoplastic material at the nozzle end of the cylinder and sealing the end of the cylinder, during the cycle of opening the dies and removing the casting therefrom, to prevent the discharge of the thermoplastic material from said cylinder.

LOUIS H. MORIN.
DAVIS MARINSKY.